(12) United States Patent
Sinzawa et al.

(10) Patent No.: US 6,746,139 B2
(45) Date of Patent: Jun. 8, 2004

(54) ROOM LAMP FIXING STRUCTURE

(75) Inventors: Kouichi Sinzawa, Saitama Prefecture (JP); Hirofumi Okano, Saitama Prefecture (JP)

(73) Assignee: Kabushiki Kaisha T AN T, Kawagoe (JP)

( * ) Notice: Subject to any disclaimer, the term of this patent is extended or adjusted under 35 U.S.C. 154(b) by 0 days.

(21) Appl. No.: 10/235,635

(22) Filed: Sep. 6, 2002

(65) Prior Publication Data
US 2003/0072166 A1 Apr. 17, 2003

(30) Foreign Application Priority Data

Oct. 12, 2001 (JP) .......................................... 2001-315418

(51) Int. Cl.[7] ................................................ B60Q 1/00
(52) U.S. Cl. ........................ 362/490; 362/488; 362/544; 362/249; 362/398
(58) Field of Search ................................. 362/488, 490, 362/544, 249, 398

(56) References Cited

U.S. PATENT DOCUMENTS 5,205,632 A * 4/1993 Crinion ........................ 362/33
6,003,928 A * 12/1999 Curtindale .................. 296/97.9
6,056,423 A * 5/2000 Takano et al. ............... 362/488
6,467,937 B2 * 10/2002 Nagata et al. ............... 362/490

FOREIGN PATENT DOCUMENTS

JP          6-65093          9/1994

* cited by examiner

*Primary Examiner*—Thomas M. Sember
(74) *Attorney, Agent, or Firm*—Nixon & Vanderhye P.C.

(57) ABSTRACT

A room lamp fixing structure fixes a room lamp to an automobile roof panel. The room lamp fixing structure most preferably includes a trim piece and a room lamp cover to cover the room lamp. A first room lamp fixing structure is attached to the cover of the room lamp. A second room lamp fixing structure fixes the room lamp to said trim. The first and second room lamp fixing structures therefore cooperate to fix the room lamp to the roof panel together with the trim. Most preferably, the first room lamp fixing structure includes a magenetic member and/or a hook-and-loop fastener.

14 Claims, 4 Drawing Sheets

ROOM LAMP FIXING STRUCTURE

BACKGROUND OF THE INVENTION

The present invention relates to a room lamp fixing structure in an automobile and more particularly to a room lamp fixing structure in which a room lamp is first attached to a trim before said trim thus attached with the room lamp is mounted to the automobile roof panel such that said room lamp is attached to the roof panel together with the trim.

Conventionally, the room lamp fixing structure of this type was disclosed in Japanese Utility Model Laid Open to Public No. 6-65093. This device is structured such that a trim and a room lamp are fixed to the roof panel by having the trim pinched between the flange of the room lamp and the bracket, said bracket having a leaf spring at a tip end portion thereof, said leaf spring being brought into engagement with an engagement hole formed in the roof panel.

In said prior art, the room lamp is attached to the trim by inserting the room lamp into a lamp attaching hole formed in the trim; and the bracket is pressed into the clip of the room lamp such that the edge of the trim is held between the bracket and the body of the room lamp; that is, troublesome procedures in attaching the room lamp to the trim are inevitably involved.

Further, the room lamp is attached to the roof panel with said bracket being merely resiliently engaged in the hole; that is, the trim and the roof panel are not directly attached with each other with the result this very unstable attachment can lead to the generation of noise due to the vibration of the vehicle in motion and the play therefrom.

SUMMARY OF THE INVENTION

The present invention was made in order to solve the above mentioned problems and its object is to provide a room lamp fixing structure which is free from unnecessary play to generate vibration and the noise such that work efficiency is improved and positive fixing of the room lamp to the roof panel is realized by securing a coupling member attached to the light shielding cover to the roof panel such that the room lamp per se is fixed to the vehicle roof panel together with the trim.

In order to realize the object of the invention, there is essentially provided a room lamp fixing structure which comprises a roof of the vehicle; a roof panel to be attached to said roof; a trim; a room lamp; a room lamp cover to cover said room lamp; first room lamp fixing means including first connecting means fixed to said roof of the vehicle and second connecting means attached to said cover of the room lamp; and second room lamp fixing means for fixing a room lamp to said trim, wherein said first and second room lamp fixing means cooperate to fix said room lamp to said roof panel together with said trim.

BRIEF DESCRIPTION OF THE DRAWINGS

FIG. 2a is a partly enlarged exploded perspective view of the structure which shows a Hook-and-Loop fastener attached to the room lamp cover while FIG. 2b is a partly enlarged side elevation which shows the Hook and Loop fastener;

DETAILED EXPLANATION OF THE EMBODIMENTS

Figure 1:
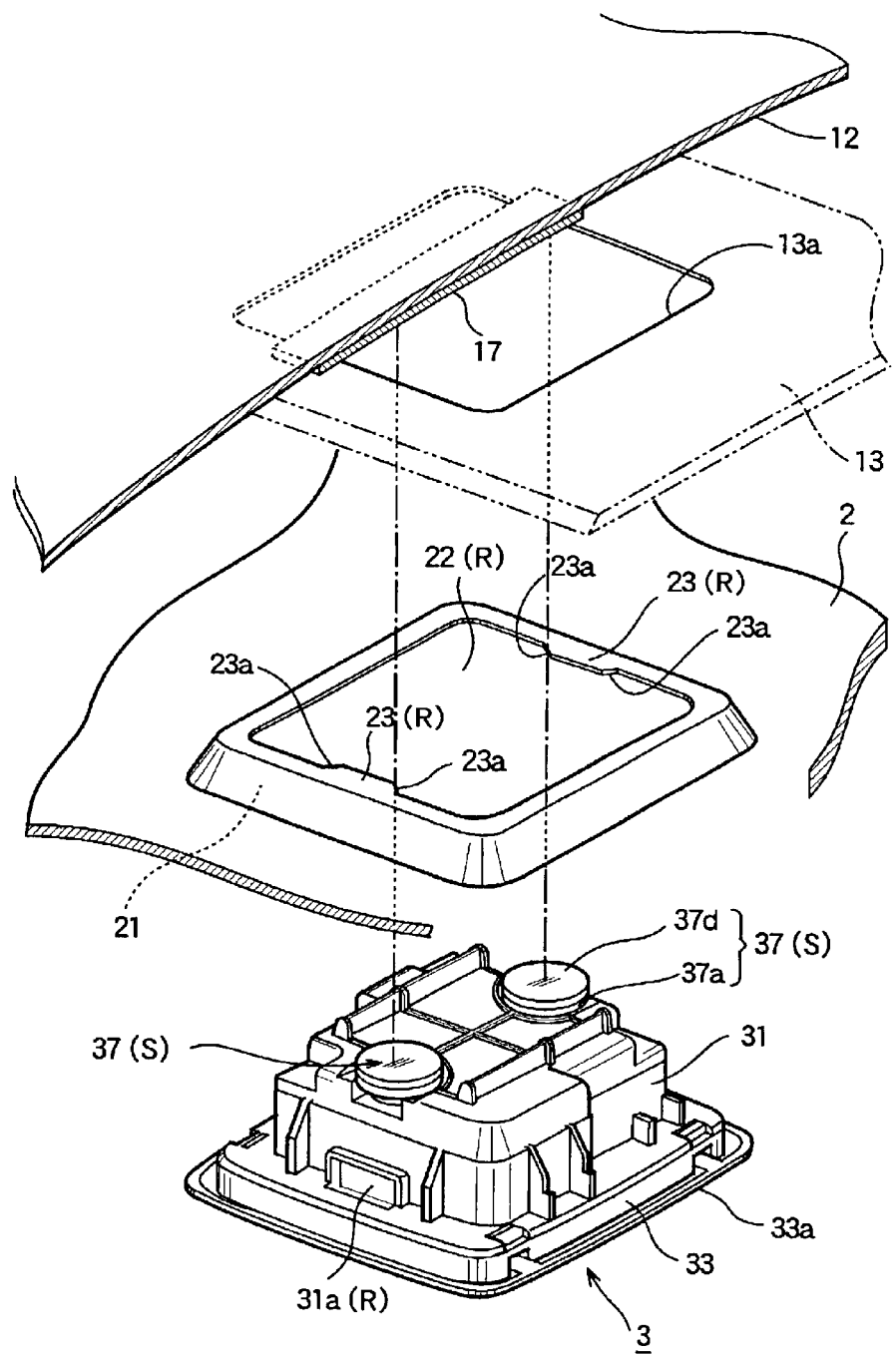
FIG. 1 is an exploded perspective view of one embodiment of the invention directed to the fixing structure of the room lamp in which a first room lamp fixing means and a second room lamp fixing means are shown.
Figure 3:
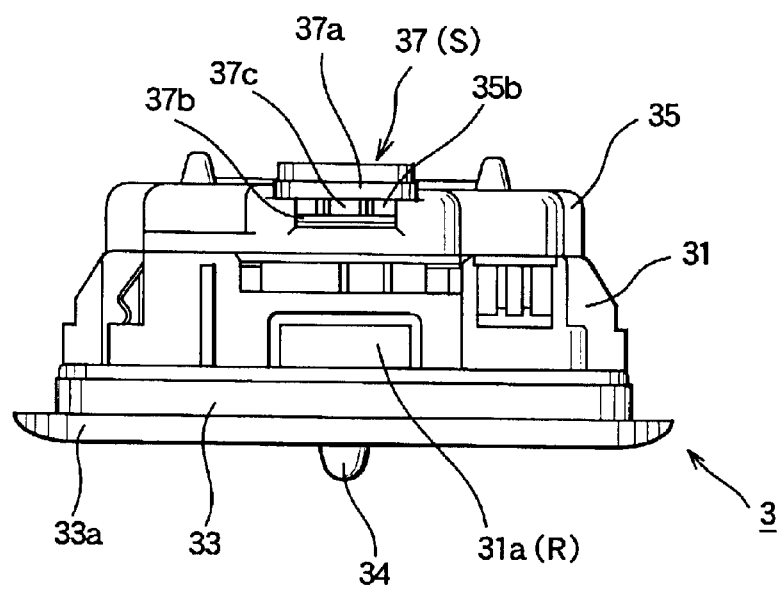
FIG. 3 is a front view of the room lamp of FIG. 1 viewed from the left side.
Figure 4:
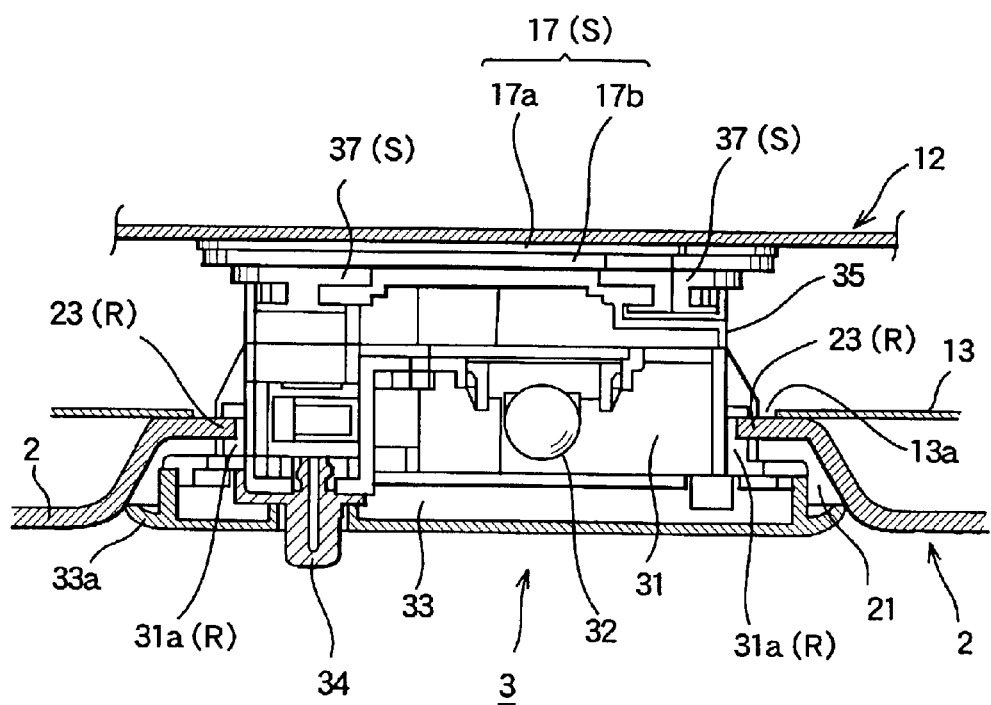
FIG. 4 is a sectional view of the room lamp being fixed.
Figure 5:
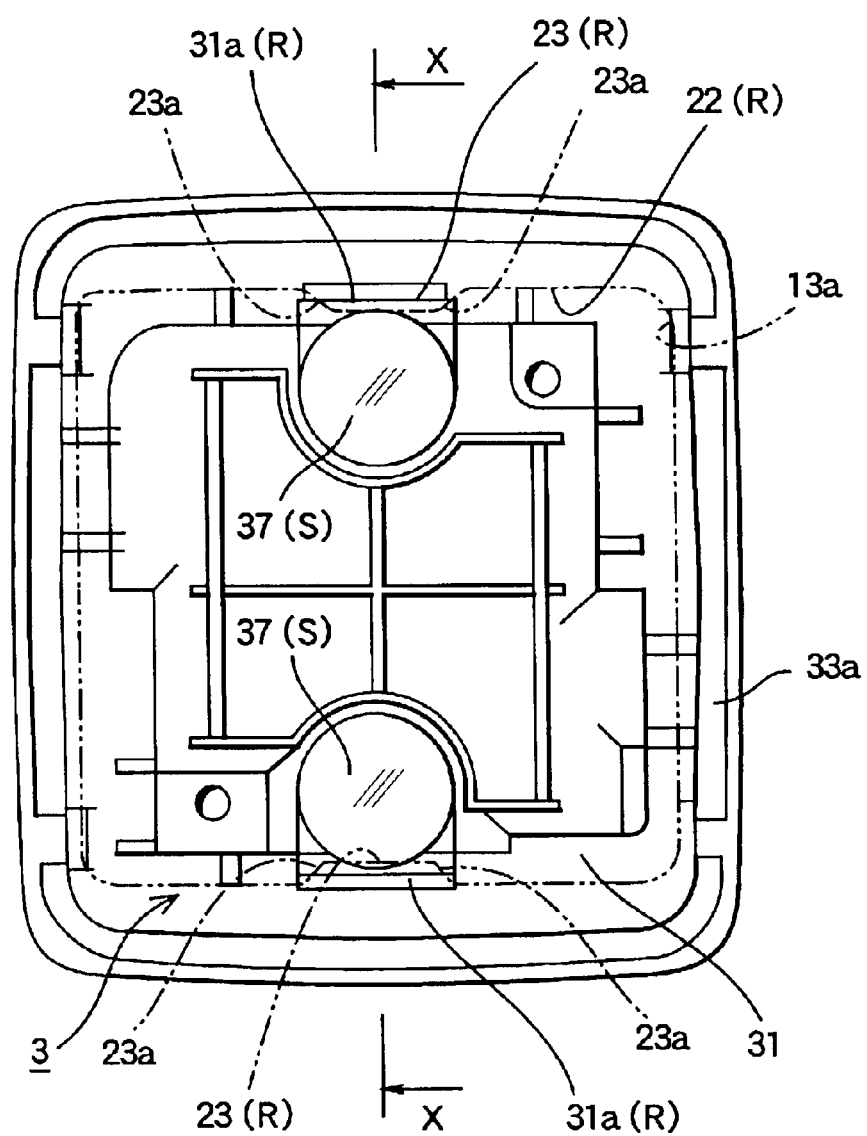
FIG. 5 is an explanatory view showing the relationship of the fixing hole in the roof panel, the room lamp fixing hole in the trim and the room lamp.

Hereinafter, one embodiment of the present invention will be explained with reference to the drawings. FIG. 1 shows a roof 12, a roof panel 13, a trim 2, and a room lamp 3. Said room lamp 3 has first room lamp fixing means in the form of an engagement recess 31a and second room lamp fixing means in the form of disk-shaped Hook-and-Loop fasteners 37. FIG. 2a and FIG. 2b show said Hook-and-Loop fastener 37 and a room lamp cover 35 having a structure to which said Hook-and-Loop fastener 37 is fixed. Said room lamp 3 of FIG. 1 is shown in FIG. 3 as viewed from the left side. Said room lamp 3 as being fixed to the roof is shown in FIG. 4. In FIG. 5, the relationship between the fixing hole 13a in the roof panel 13, the room lamp fixing hole 22 in the trim 2 and the room lamp 3.

It is to be noted that FIG. 1 shows said trim 2 such that a recess 21 formed therein stands out while FIG. 4 is a cross section along the line X—X of FIG. 5.

Now back to FIG. 1, said roof panel 13 is prepared to be fixed to the roof of the vehicle with a desired spacing therebetween. Said roof panel 13 is formed with the insertion hole 13a into which said room lamp 3 is to be inserted.

Further, a sheet-like Hook-and-Loop fastener 17 is attached to the underside of said roof 12 within an area opposite the insertion hole 13a of the roof panel 13. It is to be noted that said sheet-like Hook-and-Loop fastener 17 has a larger area than each disk-shaped Hook-and-Loop fastener 17. Said sheet-like Hook-and-Loop fastener 17 is composed of a base 17a to be bonded to the roof 12 and an engagement portion 17b fixed to said base 17a.

The trim 2 shown in FIG. 1 is composed of a substrate of foamed material for example of polyurethane and a covering material like felt to cover the underside of said substrate.

The central portion of said trim 2 is deformed into the recessed portion 21 sized to receive the room lamp 3 from thereunder, said recessed portion 21 jutting upward and having a room lamp fixing opening 22 in a floor of said recess 22. Said floor remains in the form of a rim which has a pair of projections 23 extending into said opening 22 to oppose each other. Each projection has convergent sides 23a coming increasingly closer to each other.

The room lamp 3 is composed of a plastic housing 31, a light source bulb 32 accommodated in said housing 31, a lens 33 closing an open underside of said housing 31 and having a flange 33a extending around the outside of the housing 31, an operation knob 34 attached to a switch (not shown) such that a push button portion of said operation knob 34 extrudes downwardly, and a cover 35 attached to the top of said housing 31 to prevent the light from leaking.

As shown in FIG. 4 and FIG. 5, said housing 31 has two opposite sides integrally formed with engagement recesses 31a into which said projections 23 of the trim 2 are to be inserted.

Figure 2:
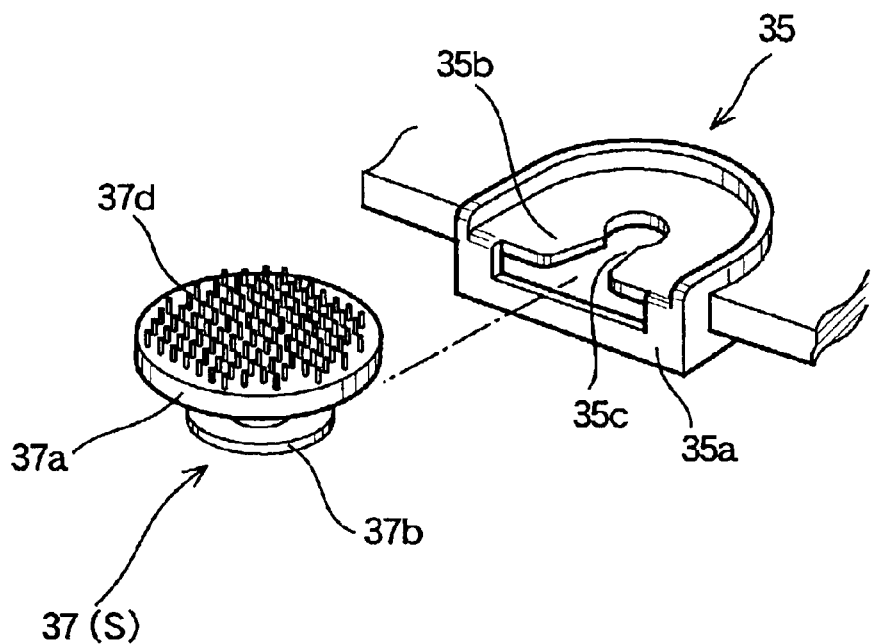
Figure 2:
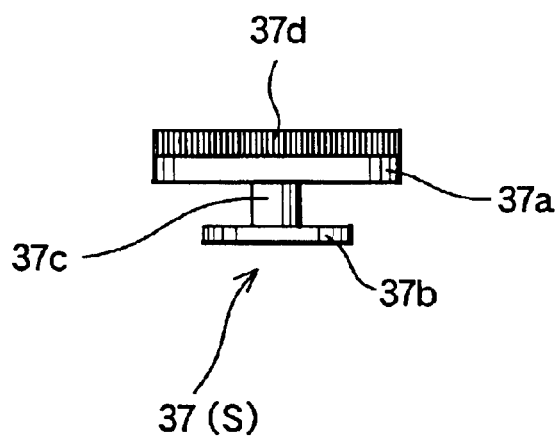

In order to mount said disk-shaped Hook-and-Loop fasteners 37 to the cover 35, said cover 35 is provided as shown in FIG. 2 with an engagement portion 35a having a floor portion 35b which is formed with insertion cutout 35c for receiving the Hook-and-Loop fastener 37 therein.

On the other hand, said disk-shaped Hook-and-Loop fastener 37 is comprised of a first and second bases 37a and 37b with a spacing to hold said floor portion 35b of the lid 35 therebetween, a connecting pole 37c to join said first base 37a and said second base 37b such that said connecting pole 37c is detachably inserted into said cutout 35c, and an engagement portion 37d integrally formed on the top of the base 37a to be connected to the engagement portion 17b of said sheet-like Hook-and-Loop fastener 17.

Said room lamp fixing hole 22, said respective projections 23, and said engagement recesses 31a all cooperate to constitute the second room lamp fixing means R for fixing the room lamp to the trim. Further, said Hook-and-Loop fasteners 17 and 37 cooperate to constitute second room lamp fixing means S.

Next, the respective fasteners 17 and 37 constituting said first room lamp fixing means S will be explained.

First, the positional relationship of the roof 12 and the roof panel 13 is predetermined. Then, said sheet-like Hook-and-Loop fastener 17 is attached to the roof 12 by bonding the base 17 thereof to the roof 12 before said fixing hole 13a of the roof panel 13 is brought into a position to correspond to the sheet-like Hook-and-Loop fastener 17. On the other hand, said two disk-shaped Hook-and-Loop fasteners 37 are attached to the cover 35 as shown in FIG. 4 by positioning the space between the first and second bases 37a and 37b of each disk-shaped Hook-and-Loop fastener 37 in correspondence with the floor portion 35b of the cover 35 of the housing 3 to insert said connecting pole 37c into the insertion cutout 35c while the second base 37b into the floor portion 35b.

Next, a method of attaching the room lamp 3 to the roof 12 by way of the trim 2 will be explained hereinafter.

First, the housing 31 is positioned between the trim 2 and the lens 33 such that the respective engagement recesses 31a are brought into correspondence with the respective projections 23 of the trim 2. Then, the housing 31 is inserted into the room lamp fixing opening 22 until the respective projections 23 are pressed and warped by the housing 31 while the flange 33a come into contact with the inner face of the recess 21. In this condition, the respective projections 23 are pressed into the engagement recesses 31a which are positioned in correspondence thereto, thus completing the fixture of the room lamp onto the trim by means of the first room lamp fixing means R.

With the room lamp 3 being fixed to the trim 2 by means of the second room lamp fixing means R, part of each side of the respective projections 23a which converges toward the tip end thereof comes into contact with the inner periphery at the exit of the respective engagement recesses 31a as shown in FIG. 5 with the result that the room lamp is restrained from to-and-fro and back-and-forth movements, thus eliminating a play against the trim 2.

After the room lamp 3 is thus fixed to the trim 2, the housing 31 of the room lamp 3 is inserted into the insertion hole 13a in the roof panel 13 such that the engagement portions 37d of the disk-shaped Hook-and-Loop fasteners 37 are brought into engagement with the engagement portion 17b of the sheet-like Hook-and-Loop fastener 17 with the result that the room lamp 3 is fixed to the roof 12 with the trim 2 being fixed by way of the room lamp 3 by means of the first room lamp fixing means S.

Although the Hook-and-Loop fasteners 17 and 37 are used as coupling members in the previous embodiment, magnets may be substituted for the disk-shaped Hook-and-Loop fasteners 37 attached to the cover 35 while the sheet-like Hook-and-Loop fastener 17 to be attached to the roof 12 is removed and said magnet is directly attached to the roof 12 of magnetic material.

In this way, the invention makes it possible to reduce the man hour for work on the assembly line of automobile production because one-touch attachment of the room lamp and the trim to the roof panel is possible by means of room lamp fixing means.

Further, the sides of each projection which converge toward the tip end thereof come into partly engagement with the inner periphery of the exit of the engagement recess such that the room lamp is restrained from to-and-fro and back-and-forth movements which can otherwise create unnecessary play within the trim.

Further, since the Hook-and-Loop fasteners used as coupling members allows to design that the faster on the cover may be of detachable design, it has an advantage that replacement thereof is easily done in the event of insufficient performance of the fastener on the cover.

What is claimed is:

1. A room lamp fixing structure of a vehicle which comprises a roof of the vehicle; a roof panel to be attached to said roof; a trim piece; a room lamp; a room lamp cover to cover said room lamp; first room lamp fixing means including at least one of a magnetic member and a hook-and-loop fastener attached to said cover of the room lamp; and second room lamp fixing means for fixing a room lamp to said trim, wherein said first and second room lamp fixing means cooperate to fix said room lamp to said roof panel together with said trim.

2. A room lamp fixing structure as set forth in claim 1, wherein said first room lamp fixing means includes a first part of a hook-and-loop fastener attached to said roof and a second part of a hook-and-loop fastener attached to said cover.

3. A room lamp fixing structure as set forth in claim 2, wherein said second Hook-and-Loop fastener attached to said cover is detachable.

4. A room lamp fixing structure as set forth in claim 3, wherein said first room lamp fixing means includes a room lamp fixing opening formed in said trim, a plurality of projections formed in said trim at said opening thereof, a housing to accommodate said room lamp therein, and a plurality of recesses formed in said housing of the room lamp to receive the respective projections upon insertion of said housing into said room lamp fixing opening in the trim.

5. A room lamp fixing structure as set forth in claim 4, wherein each of said plurality of projections has two sides converging toward the tip end thereof such that said plurality of projections come into contact with the inner periphery of said plurality of recesses at an exit thereof, respectively, to prevent said room lamp from making to-and-fro and back-and-forth movements.

6. A room lamp fixing structure as set forth in claim 3, wherein said room lamp includes a housing for housing a light therein, and wherein said cover of the room lamp is adapted to shield the light from within the housing of the room lamp.

7. A room lamp fixing structure as set forth in claim 2, wherein said first room lamp fixing means includes a room lamp fixing opening formed in said trim, a plurality of projections formed in said trim at said opening thereof, a housing to accommodate said room lamp therein, and a plurality of recesses formed in said housing of the room lamp to receive the respective projections upon insertion of said housing into said room lamp fixing opening in the trim.

8. A room lamp fixing structure as set forth in claim 7, ach of said plurality of projections has two sides converging toward the tip end thereof such that said plurality of projections come into contact with the inner periphery of said plurality of recesses at an exit thereof, respectively, to prevent said room lamp from making to-and-fro and back-and-forth movements.

9. A room lamp fixing structure as set forth in claim 2, wherein said room lamp includes a housing for housing a light therein, and wherein said cover of the room lamp is adapted to shield the light from within the housing of the room lamp.

10. A room lamp fixing structure as set forth in claim 1, wherein said first room lamp fixing means includes a room lamp fixing opening formed in said trim, a plurality of projections formed in said trim at said opening thereof, a housing to accommodate said room lamp therein, and a plurality of recesses formed in said housing of the room lamp to receive the respective projections upon insertion of said housing into said room lamp fixing opening in the trim.

11. A room lamp fixing structure as set forth in claim 10, wherein each of said plurality of projections has two sides converging toward the tip end thereof such that said plurality of projections come into contact with the inner periphery of said plurality of recesses at an exit thereof, respectively, to prevent said room lamp from making to-and-fro and back-and-forth movements.

12. A room lamp fixing structure as set forth in claim 1, wherein said room lamp includes a housing for housing a light therein, and wherein said cover of the room lamp is adapted to shield the light from within the housing of the room lamp.

13. A room lamp adapted to being attached to a vehicle body panel comprising:

a room lamp cover to cover the room lamp; and a room lamp fixing assembly to attach the room lamp cover to the vehicle body panel, said room lamp fixing assembly comprising at least one of a magnetic member and a hook-and-loop fastener, wherein said fixing system is adapted to removably attach the room lamp cover, and hence the room lamp, to the vehicle body panel by means of one-touch engagement therewith; and wherein said room lamp fixing assembly further comprises a housing to accommodate said room lamp therein, a trim piece, a room lamp fixing opening formed in said trim, a plurality of projections formed in said trim at said opening thereof, and a plurality of recesses formed in said housing of the room lamp to receive the respective projections upon insertion of said housing into said room lamp fixing opening in the trim.

14. A room lamp as set forth in claim 13, wherein said room lamp includes a housing for housing a light therein, and wherein said cover of the room lamp is adapted to shield the light from within the housing of the room lamp.

\* \* \* \* \*